United States Patent [19]

Elkins

[11] Patent Number: 5,408,862

[45] Date of Patent: Apr. 25, 1995

[54] EARTHQUAKE EARLY WARNING SYSTEM

[76] Inventor: Jack D. Elkins, Rte. 2, Box 272 Pickel Farm Rd., Kinston, Tenn. 37763

[21] Appl. No.: 238,506

[22] Filed: May 5, 1994

[51] Int. Cl.6 .............................................. G01V 5/00
[52] U.S. Cl. .................... 73/23.2; 73/864.73; 324/324
[58] Field of Search ............... 73/23.2, 863, 863.33, 73/864, 864.74, 863.81, 432.1, 864.73; 324/324; 436/25, 28

[56] References Cited

U.S. PATENT DOCUMENTS

| 4,065,972 | 1/1978 | Holub et al. | |
| 4,297,574 | 10/1981 | Card et al. | 250/253 |
| 4,642,296 | 2/1987 | Hubner | 73/23.2 X |
| 4,735,095 | 4/1988 | Issel | 73/863.33 X |
| 4,786,804 | 11/1988 | Ilmasti | 250/253 |
| 5,137,830 | 8/1992 | Milly | 436/25 |

FOREIGN PATENT DOCUMENTS

| 438794 | 12/1926 | Germany | 73/864.74 |
| 63-290937 | 11/1988 | Japan | 73/864.74 |
| 1-265133 | 10/1989 | Japan | 73/864 |
| 828008 | 5/1981 | U.S.S.R. | 73/864 |

Primary Examiner—Hezron E. Williams
Assistant Examiner—J. David Wiggins
Attorney, Agent, or Firm—Pitts & Brittian

[57] ABSTRACT

An early warning system for providing notice that seismic activity, such as an earthquake, is imminent. The earthquake early warning system includes a subterranean detector unit assembly having a plurality of detector units carried by a subterranean inverted conduit. The conduit is filled with a dense, dry inert aggregate and has a soil interface consisting of a perforated metal screen or porous fabric material thus allowing migrating gases to migrate into the conduit. Gas detectors carried by the conduit detect the gases as they migrate into the conduit. Access tubes are provided to allow access to the detectors from the surface of the ground without exhuming the conduit assembly. The conduit would carry a plurality of detectors and associated access tubes for monitoring migration of gases across a linear distance. The detectors are in communication with a monitoring facility for monitoring the rate of migration of gases. The monitoring facility has means for sensing a rate of gaseous migration accelerated beyond the normal background rate and thus trigger an alarm that seismic activity that may precede an earthquake is occurring. In the preferred embodiment, the conduit would follow a slope, or a known fault line and would be arrayed with other subterranean, assemblies in a given area.

16 Claims, 5 Drawing Sheets

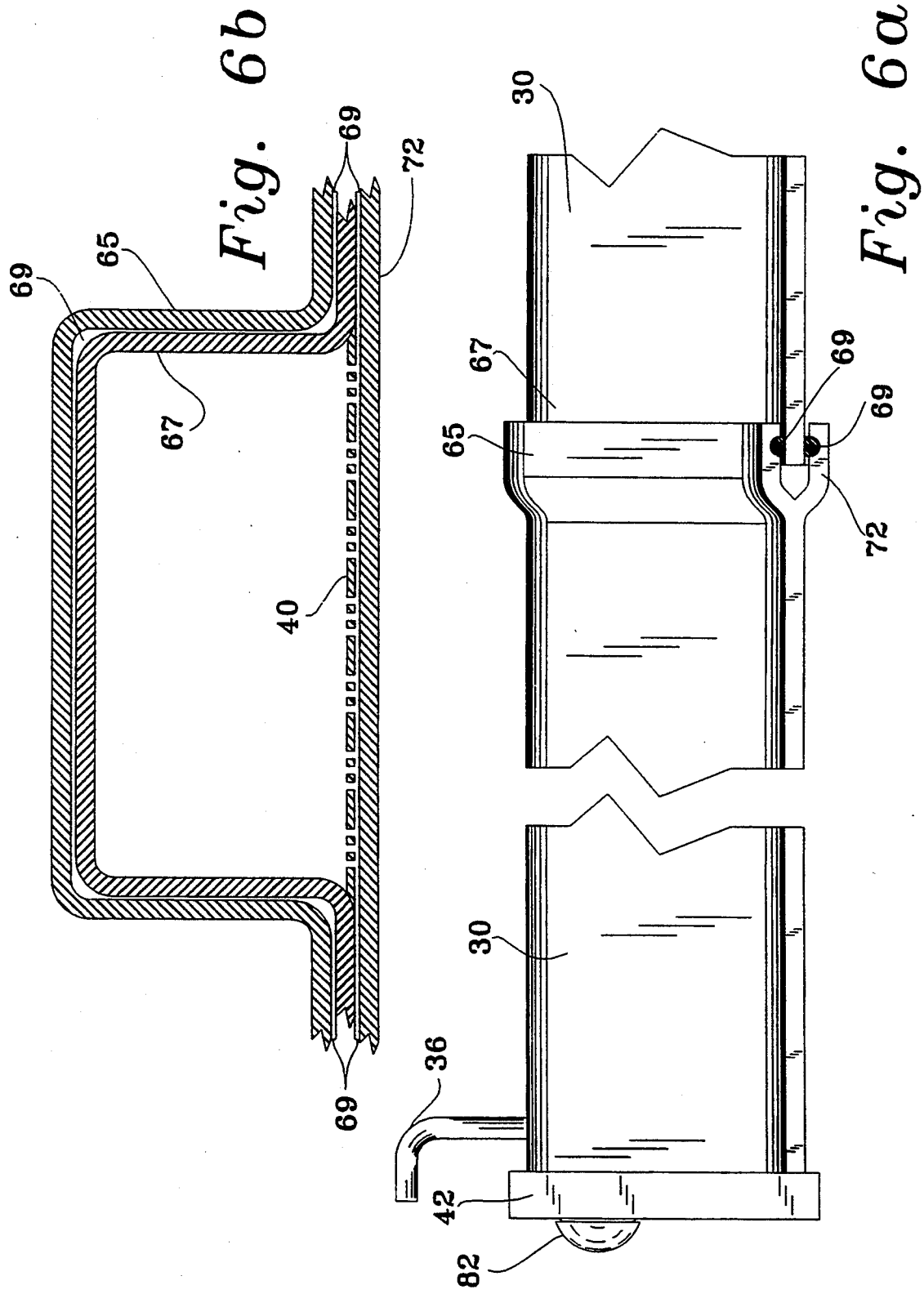

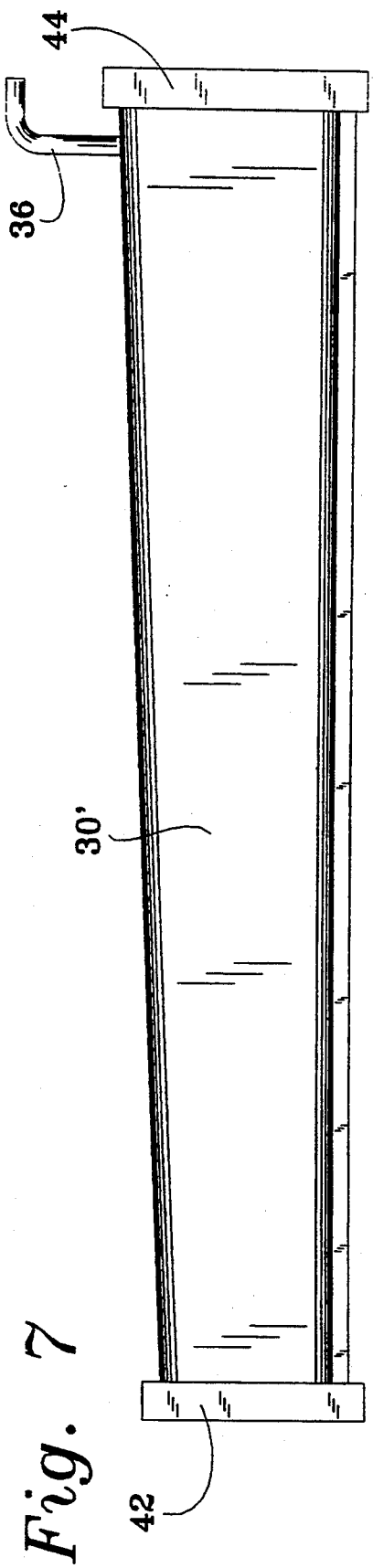
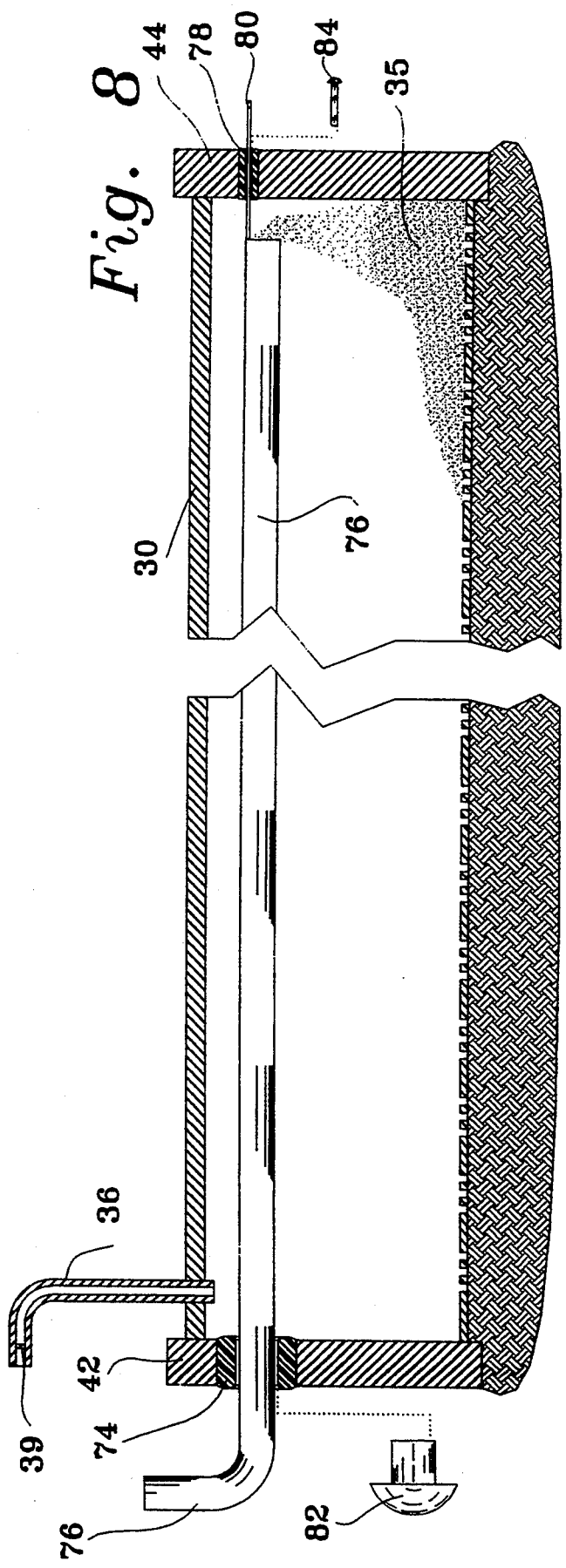

EARTHQUAKE EARLY WARNING SYSTEM

TECHNICAL FIELD

This invention relates to the field of seismology. More particular, it relates to a seismic activity early warning system for providing advance notice of imminent seismic activity such as tremors and/or earthquakes.

BACKGROUND ART

Various seismic phenomena, such as tremors and catastrophic earthquakes, are known to cause devastating loss of life, injury, property damage directly associated with the moving of the earth's surface, as well as collateral damage, both in terms of human life and property, resulting from fires that start as a result of damaged electrical power lines and ruptured gas mains. While much has been learned about the mechanisms that cause various seismic phenomena, such as tremors and catastrophic earthquakes, there is presently no means for predicting when or where seismic activity will occur and thus there has been no means of providing an early warning that would reduce the number of casualties, and perhaps prevent much of the collateral property damage associated with seismic activity. What is needed is an early warning system that could provide enough notice to, at the least, facilitate evacuations and allow electrical and gas systems to be shut-off.

It will be recognized by those skilled in the art that earthquakes, and other seismic phenomenon, arise from stresses introduced by various subsurface mechanisms. It is believed that these stresses introduce micro-fractures in the subterranean strata that grow or continue to accumulate until catastrophic macro-fracture suddenly occurs.

Subsurface strata store gases and fault zones are well known storage sites for hydrocarbon gases. When micro-fractures develop within buried strata, the trapped gases are more free to migrate in a buoyant or vertical sense. Even in stable and rather dense formations, geologists have been able to verify measurable and often significant migrations of hydrocarbon gases.

In this regard, it has been known in the field of geophysical prospecting that gaseous substances associated with subterranean deposits of minerals, hydrocarbons, such as coal, oil and gas, and other materials migrate towards the earth's surface. In this regard, U.S. Pat. No. 4,065,972 issued on Jan. 3, 1978, to Holub et al. discloses a method and apparatus for detection of subterranean deposits based on this phenomenon. It has also been learned that these methods of geophysical prospecting are often inaccurate as the vertical migration of gaseous substances tends to follow fault lines and other lines of demarcation in the substrata of the earth's surface.

U.S. Pat. No. 4,297,574 issued on Oct. 27, 1981, to Card et al. discloses a method for detecting radon gas decay products and U.S. Pat. No. 4,786,804 issued on Nov. 22, 1988, to Ilmasti discloses a device for measuring radon gas in the soil.

However, what is needed is an earthquake early warning system that provides notice of an imminent seismic activity such as tremors and/or earthquakes so as to allow time to facilitate evacuation of threatened structures and further facilitate shutting-off threatened electrical systems and gas mains.

Accordingly, it is an object of this invention to provide a system for providing an early warning that seismic activity such as earthquakes and/or tremors is imminent.

It is a further object of the present invention to provide such an earthquake early warning system by detecting sudden or sustained increases in the migration of subterranean gases towards the surface of the earth.

Other objects and advantages over the prior art will become apparent to those skilled in the art upon reading the detailed description together with the drawings as described as follows.

DISCLOSURE OF THE INVENTION

In accordance with the various features of this invention, an early warning system for providing notice that seismic activity, such as an earthquake, is imminent is provided. Fixed locations are chosen for monitoring the rate at which migrating gases are approaching the earth's surface. Several stations are deployed to monitor a zone suspected of seismic activity. Data from these stations is transmitted to a central location where its is monitored. In the preferred embodiment, the earthquake early warning system includes a subterranean detector unit assembly having a plurality of detector units carried by a subterranean inverted conduit. The inverted conduit is filled with a dense, dry inert aggregate, such as sand, and has a soil interface consisting of a perforated metal screen or porous fabric material thus allowing migrating gases to migrate into the inverted conduit. Additionally, the inverted conduit includes a flange to reduce surface originated groundwater influences. As the gases migrate along the inverted conduit, the gases contact, and are detected by state of the art detectors, such as CALECTRO GC ELECTRONICS, Catalog no. J4-807. Access tubes carried by the inverted conduit allow access to the detectors from the surface of the ground without exhuming the inverted conduit assembly. The inverted conduit would carry a plurality of detectors and detector tubes and associated access tubes for monitoring migration of gases across a linear distance. The detectors are in communication with a monitoring facility for monitoring the rate of migration of gases. In the preferred embodiment, the subterranean, inverted conduit would follow a slope, or a known fault line and would be arrayed with other subterranean, inverted-conduit assemblies in a given geographic area.

For earthquakes to happen, there is a probable, stable and slow application of stress, during which, micro-fractures begin to develop. The number of micro-fractures grows in a slowly accelerating manner until the rate of acceleration begins a more rapid and non-linear growth. It is anticipated that this event is accompanied by an increase in the amount of hydrocarbon gases that are released and migrate along a vertical, or nearly vertical migration pathway that ultimately reaches the earth's surface. This rate of migration is monitored by the present invention and an earthquake warning can be given as the rate of migration significantly accelerates beyond the normal background level.

BRIEF DESCRIPTION OF THE DRAWINGS

The above mentioned features of the invention will become more clearly understood from the following detailed description of the invention read together with the drawings in which:

FIGS. 6a and 6b illustrate the preferred male-female joint for joining sections of the subterranean inverted-conduit, with FIG. 6a showing a side elevational view and FIG. 6b showing a cross-sectional view of the male-female joint of the subterranean inverted conduit.

FIG. 7 illustrates a side elevation view of an alternate embodiment of the subterranean inverted conduit.

FIG. 8 illustrates a side cross-sectional view of the preferred embodiment of filling the subterranean inverted conduit with aggregate.

BEST MODE FOR CARRYING OUT THE INVENTION

Figure 1:
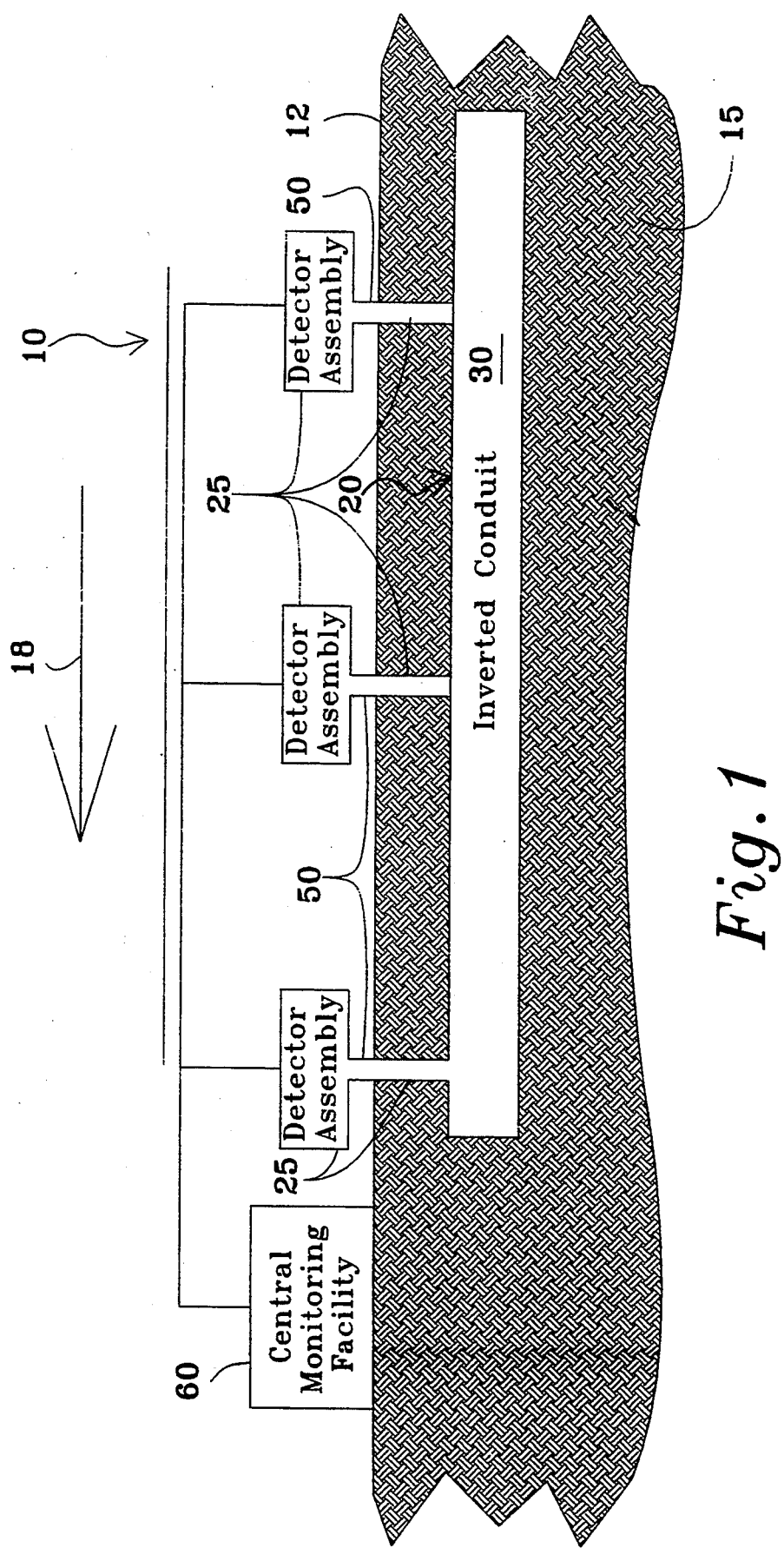
FIG. 1 illustrates a schematic drawing of the earthquake early warning system of the present invention.
Figure 2:
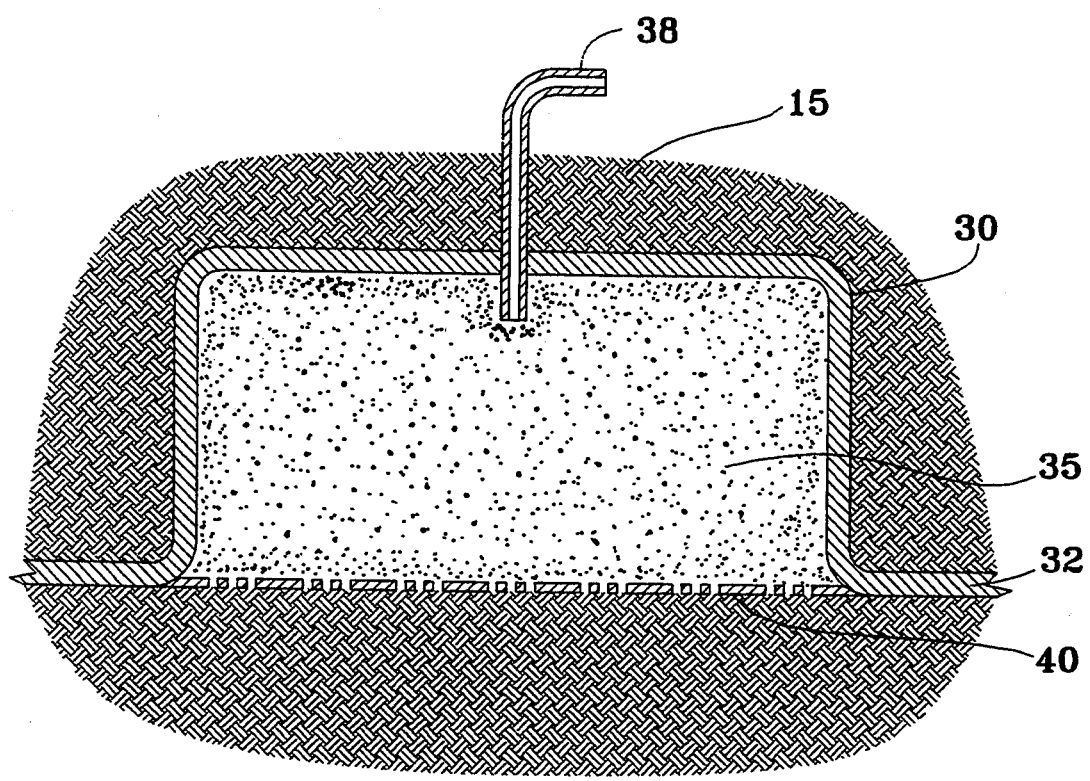
FIG. 2 illustrates a cross-sectional view of the subterranean inverted conduit utilized by the earthquake early warning system of the present invention.
Figure 3:
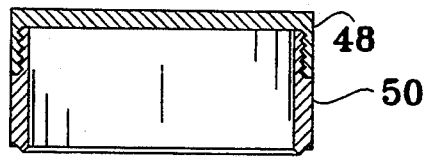
FIG. 3 illustrates a cross-sectional view of the subterranean inverted conduit showing a detector, detector tube and associated access tube for accessing the detector utilized by the earthquake early warning system of the present invention.
Figure 3:
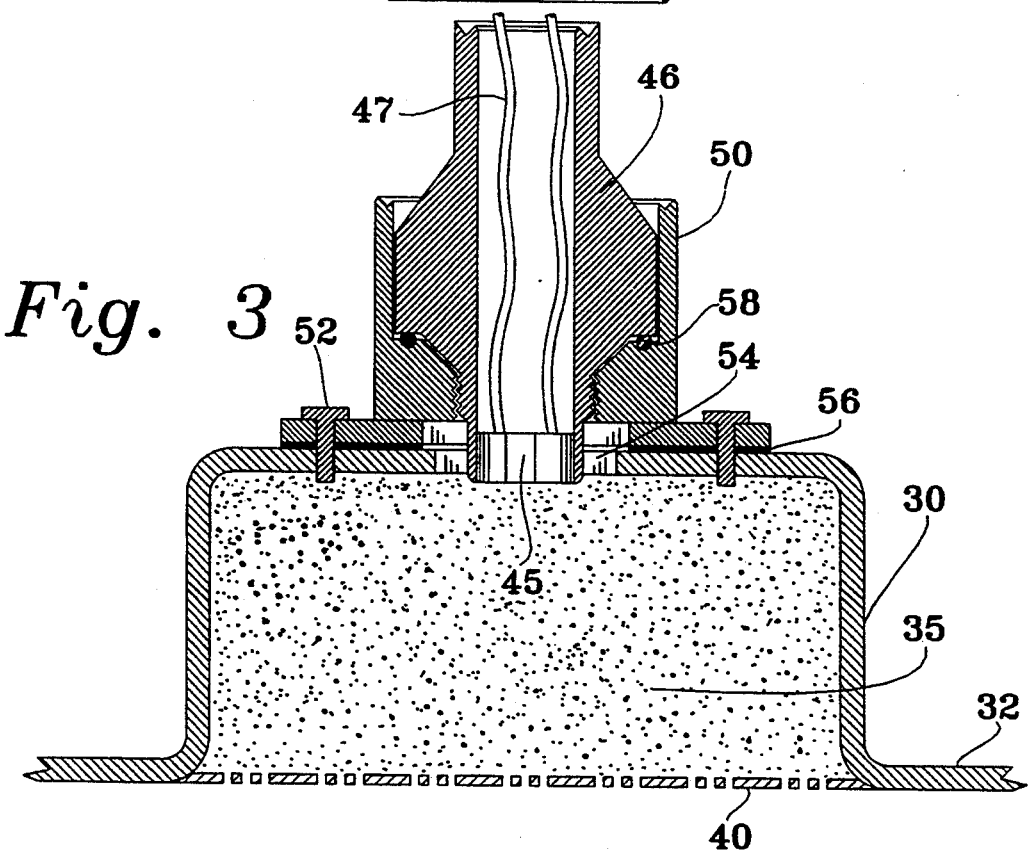

An earthquake early warning system is illustrated generally as 10 in the figures. Earthquake early warning system 10 provides notice that seismic activity, that may precede an earthquake, is occurring. In the preferred embodiment, the earthquake early warning system includes, as seen in FIG. 1, a subterranean gas collector assembly 20 comprising a subterranean, inverted conduit 30 carrying at least one detector assembly 25 and an injection valve 38, seen in FIG. 2, for testing and calibrating system 10. It will be understood that injection valve 38 is sealable to prevent atmospheric air from entering inverted conduit 30. Inverted conduit 30 follows the direction of a slope, depicted by arrow 18 in FIG. 1, thus allowing the buoyant migration of hydrocarbon gases. In an alternate embodiment, seen in FIG. 7, inverted conduit 30', is tapered to allow buoyant migration of hydrocarbon gases where inverted conduit 30' is installed in a level zone installation such as a prepared ditch bottom or beneath flatland. As seen in FIGS. 2 and 3, inverted conduit 30 is filled with a dense, dry inert aggregate 35, such as sand, and has a gas permeable soil interface 40 for retaining aggregate 35 within inverted conduit 30 while allowing gases to migrate into inverted conduit 30. In the preferred embodiment, gas permeable soil interface 40 consists of either a perforated metal screen or a porous material. Those skilled in the art will recognize that any stable, non-degrading material that will retain aggregate 35 within inverted conduit 30 while still allowing gases to migrate into inverted conduit 30 would be a suitable gas permeable soil interface. Aggregate 35 allows migrating gases to move freely and buoyantly within inverted conduit 30 while giving rigidity, mass and inertia to inverted conduit 30. Aggregate 35 also reduces the free volume within inverted conduit 30 and avoids convection due to thermal differences. Also, aggregate 35 assures a rather constant intake opening for migrating gases and assures rather constant flow passageways. Additionally, inverted conduit 30 includes a flange 32 to reduce surface originated groundwater influences and end caps 42 and 44 that seal the ends of inverted conduit 30 against intrusion by animals or insects and also assure containment of aggregate 35. In order to vent migrating gases to the atmosphere after detection, a vent 36 is disposed on the upper end of inverted conduit 30. Vent 36, in the preferred embodiment has a one-way valve 39 to prevent atmospheric backflow into inverted conduit 30.

Detector assembly 25 includes conventional state of the art detectors 45, such as CALECTRO GC ELECTRONICS, Catalog no. J4-807 and access tubes 50. Access tube 50 allows access to detector 45, for servicing and placement, from the surface 12 of the ground 15 without exhuming inverted conduit 30. In this regard, detector 45 is carried by detector tube 46 that is threadably received within access tube 50. Detector 45's associated wire leads 47 extend through the interior of detector tube 46. In the preferred embodiment, access tube 50 is secured to inverted conduit 30 in a releasable fashion, using conventional fasteners, such as threaded fastener 52 or can be permanently secured to inverted conduit 30. Access tube 50 registers, in a concentric manner, with an opening 54 in inverted conduit 30. A gasket 56 is disposed between access tube 50 and inverted conduit 30 and an O-ring 58 is disposed between detector tube 46 and access tube 50 in order to further reduce surface originated groundwater influences. A cover plate 48 is releasably secured to the top of access tube 50 in order to keep debris and precipitation out of access tube 50.

In the preferred embodiment, inverted conduit 30 carries a plurality of detector assemblies 25 for monitoring migration of gases across a linear distance. Detectors 45 are in electronic communication with a central monitoring facility 60 for monitoring the rate of migration of gases. In this regard, detectors 45 can be hard-wired to a central monitoring facility 60 or can be in radio communication with central monitoring facility 60. It will be appreciated by those skilled in the art that other methods of communicating the data from detectors 45 to central monitoring facility 60 are available.

Figure 5:
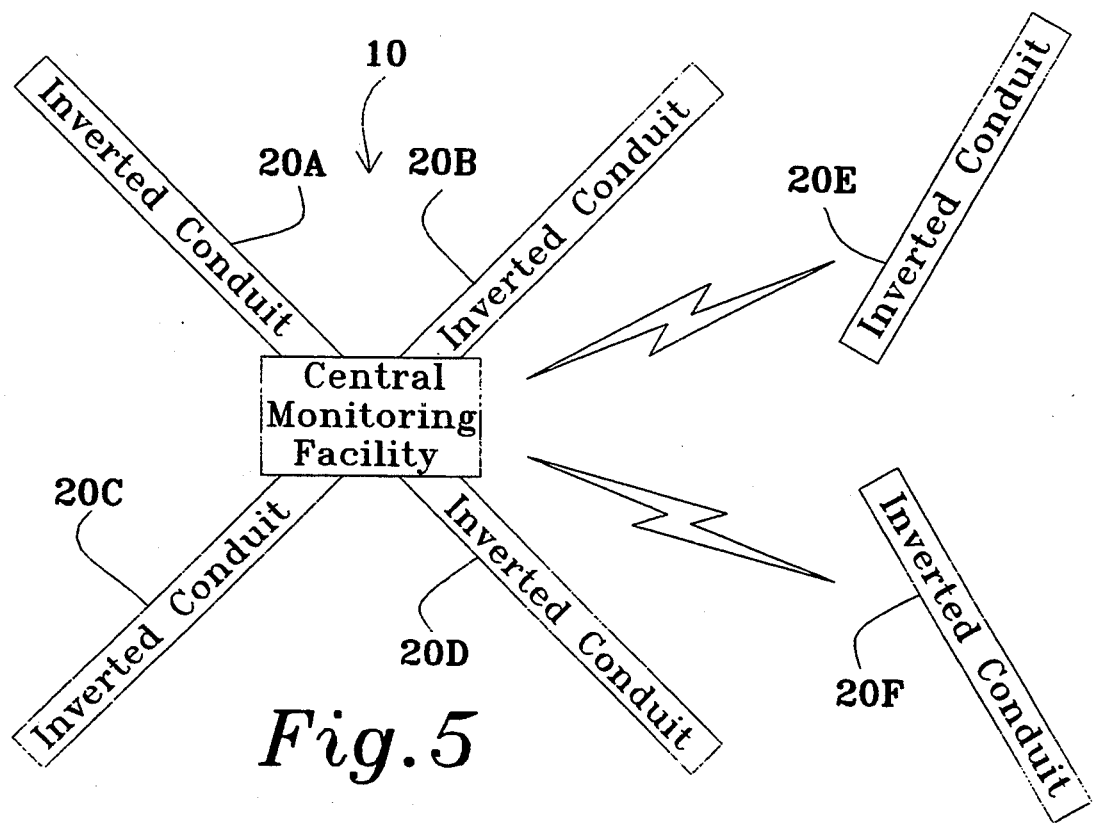
FIG. 5 illustrates a plan schematic view of an arrangement of subterranean inverted-conduit, detector unit assemblies.

In the preferred embodiment, the subterranean, inverted conduit 30 would follow a slope, or a known fault line and would be arrayed with other subterranean, inverted-conduit assemblies in a given geographic area, see FIG. 5. As seen in FIG. 5, which is a plan schematic view, inverted conduits 20A, 20B, 20C and 20D each of which would carry a plurality of detector assemblies 25 terminate at, and are in electronic communication with central monitoring facility 60. Outlying inverted conduits 20E and 20F are in radio communication with central monitoring facility 60. In the preferred embodiment, inverted conduits 20A, 20B, 20C and 20D extend in four to five directions and are placed on a slope or following a slope in order to create a buoyant migration pathway along upper surface of conduit. It will be appreciated by those skilled in the art that this array could be modified and adapted into any given geometric pattern or arrangement for a given geographic area.

It will be appreciated that, in order to effectively monitor a large area, inverted conduits 20A, 20B, 20C and 20D must extend for a large linear distance. Thus, in the preferred embodiment, inverted conduit 30 will be jointed to benefit the construction and installation of lengthy inverted conduits. The preferred joint is a male-female joint, seen in FIGS. 6a and 6b, in which one end 65 of inverted conduit 30 would be flared forming a female joint for receiving end 67 of inverted conduit 30.

A lower edge 72 is disposed beneath flange 32 such that the flange 32 adjacent to end 67 is sandwiched between lower edge 72 and the flange 32 adjacent to end 65 in a tight frictional fit. Gaskets 69 are carried within female end 65 and lower edge 72 in order to prevent groundwater seepage at the joint.

Those skilled in the art will recognize that in order to install inverted conduit 30 a trench (not shown) must be prepared, inverted conduit 30 placed into position, access tubes 50, detector tubes 46 and detectors 45 installed and finally the trench is back-filled. In the preferred embodiment, inverted conduit 30 is filled with aggregate 35 after inverted conduit 30 is in place within the prepared trench. In this regard, end cap 42 is adapted with a grommet 74 that receives a tube 76 that, preferably, is flexible. In a similar manner, end cap 44 is adapted with a grommet 78 through which a line 80, such as a thin wire, is passed. As sections of inverted conduit 30 are placed into position, line 80 is pulled through the interior of inverted conduit 30 extending therethrough for its entire length. When the desired length of inverted conduit 30 is in position, tube 76 is inserted through grommet 74, line 80 is secured to tube 76, line 80 is secured to tube 76 and end cap 42 is attached to inverted conduit 30. Those skilled in the art will recognize that the order of the above described steps can be changed. Line 80 is used to pull tube 76 through inverted conduit 30 to the a position adjacent end cap 44 as seen in FIG. 8. Aggregate 35 is then blown into the interior volume of inverted conduit 30 as tube 76 is slowly pulled back toward end cap 42. When the filling process is complete, line 80 can be severed and left in place or pulled and reused. In either instance, plugs 82 and 84 are placed into grommets 74 and 78, respectively, in order to prevent seepage of groundwater into the interior volume of inverted conduit 30. The efficiency of filling the interior volume of inverted conduit 30 would be determined by X/Y wherein X=volume of inserted aggregate 35 and Y=calculated interior volume of inverted conduit 30.

Figure 4:
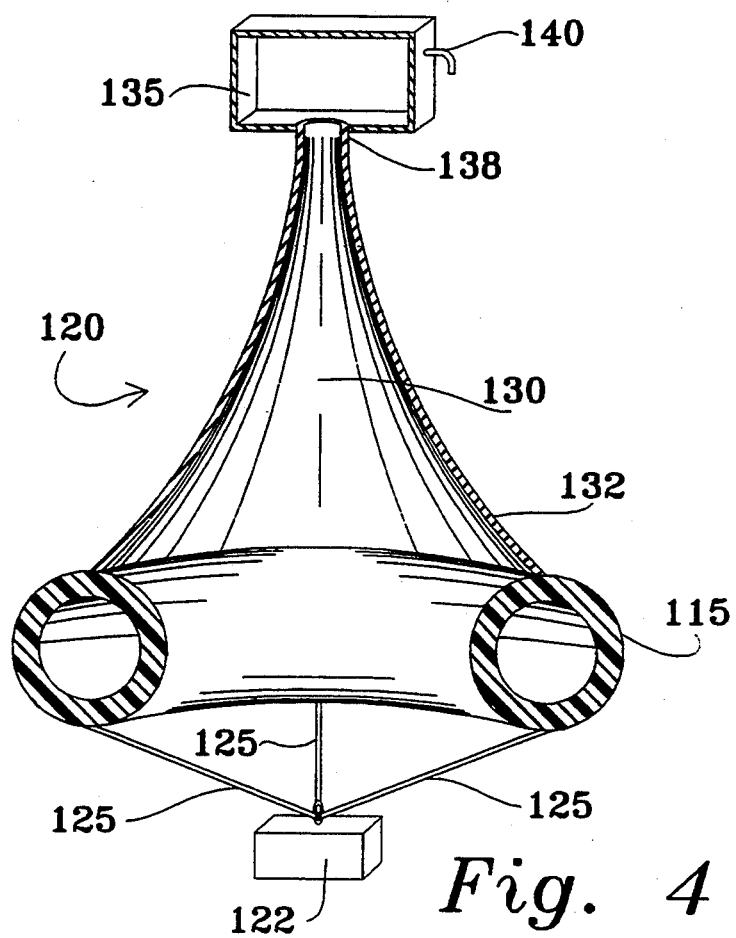
FIG. 4 illustrates an alternate embodiment of a detector unit assembly of the earthquake early warning system of the present invention for monitoring gases dissolved in spring water.

It will be appreciated by those skilled in the art that these migrating gases also percolate into spring water and/or other bodies of water. An alternate embodiment of a detector unit assembly is illustrated as 120 in FIG. 4. Detector unit assembly 120 is used to detect gases migrating through spring water and other bodies of water. Detector unit assembly 120 is provided with a toroidal float member 115. Toroidal float member 115 is stabilized in the water and is, preferably, held in position by an anchor member 122 which is suspended from toroidal float member 115 by fastening means 125. It will be recognized by those skilled in the art that anchor member 122 could be suspended by any conventional means such as a cable, line or a chain. An inverted funnel member 130, having an upper portion 138 and a lower portion 132, is carried by toroidal float member 115. The lower portion 132 of inverted funnel member 130 is concentrically joined to toroidal float member 115 in a continuous, air-tight junction. In the preferred embodiment, inverted funnel member 130 is integral with toroidal float member 115. An air-tight detector housing 135 is carried by the upper portion 138 of inverted funnel member 130. As gases migrate through water in which detector unit assembly 120 is floating, these gases migrate into and through inverted funnel member 130, through the upper portion 138 of funnel member 130 and into air-tight detector housing 135 to be detected by a detector (not shown) in the same manner as described with relation to the subterranean detector unit assembly 20. A vent 140 having a one-way valve is provided in air-tight detector housing 135 to allow the gases to be vented after detection while preventing atmospherically originated gaseous influences. A conventional transmitter, (not shown), would allow the detector unit of detector unit assembly 120 to be monitored by a central monitoring facility such as central monitoring facility 60.

Central monitoring facility 60 includes conventional processing means, (not shown) for monitoring the rate of gaseous migration, comparing the rate of migration to a known normal rate, or background level and for indicating when the rate of gaseous migration accelerates beyond the normal background level.

From the foregoing description, it will be recognized by those skilled in the art that an earthquake early warning system offering advantages over the prior art has been provided. Specifically, the present invention provides an earthquake early warning system that detects sudden or sustained increases in the migration of subterranean gases towards the surface of the earth thereby providing an early warning that seismic activity such as earthquakes and/or tremors is imminent.

While a preferred embodiment has been shown and described, it will be understood that it is not intended to limit the disclosure, but rather it is intended to cover all modifications and alternate embodiments falling within the spirit and the scope of the invention as defined in the appended claims.

Having thus described the aforementioned invention, I claim:

1. An earthquake early warning system for detecting seismic activity that precedes an earthquake, said earthquake early warning system comprising:
   a gas collector assembly including a conduit for collecting gas migrating through subterranean strata;
   at least one gas detector assembly carried by said gas collector assembly, said gas detector assembly including a gas detecting member for detecting the gas collected within said gas collector assembly;
   processing means in electronic communication with said gas detecting member for monitoring a rate of migration of the gas detected by said gas detecting member, comparing the rate of migration to a known normal background rate of migration, and for indicating when the rate of migration accelerates beyond the normal rate of migration; and
   means for providing electronic communication between said gas detecting member and said processing means.

2. The earthquake early warning system of claim 1 wherein said conduit defines a subterranean, inverted conduit member filled with an inert aggregate and including a flange member for preventing surface originated groundwater from seeping directly beneath said inverted conduit and further including a gas permeable soil interface member for retaining said aggregate within said inverted conduit while allowing the gases to migrate into said inverted conduit.

3. The earthquake early warning system of claim 1 wherein said detector assembly further includes an access tube for allowing access to said gas detecting member for servicing said gas detecting member.

4. The earthquake early warning system of claim 3 wherein said detector assembly further includes a detector tube associated with said gas detecting member and further wherein said access tube is secured to said inverted conduit and concentrically registers with an opening in said inverted conduit, said access tube further including a gasket disposed between said access tube and said inverted conduit and an O-ring disposed between said detector tube and said access tube, said gasket and said O-ring for preventing surface originated groundwater from entering said inverted conduit.

5. The earthquake early warning system of claim 1 wherein said conduit defines an inverted funnel member for collecting gases migrating through water, said inverted funnel member having an upper portion and a lower portion, and wherein said gas collector assembly further includes a toroidal float member stabilized in the water by a fastening member, said toroidal float member being concentrically joined to said lower portion of said inverted funnel member with a continuous air-tight junction; and wherein said gas detector assembly further includes an air-tight detector housing carried by said upper portion of said inverted funnel member for housing said gas detector member; a vent having a one-way valve for venting the gases after detection and for preventing atmospherically originated gaseous influences and means for providing electronic communication with said processing means.

6. The earthquake early warning system of claim 5 wherein said toroidal float member is secured to an anchor member by said fastening member.

7. The earthquake early warning system of claim 1 wherein said processing means is in electronic communication with a plurality of said gas detecting members.

8. An earthquake early warning system for detecting seismic activity that precedes an earthquake, said earthquake early warning system comprising:
- a plurality of gas collector assemblies each including a subterranean, inverted conduit member for collecting hydrocarbon gas migrating through subterranean strata, said conduit member filled with an inert aggregate and including a flange member for preventing surface originated groundwater from seeping directly beneath said inverted conduit and further including a gas permeable soil interface member for retaining said aggregate within said inverted conduit while allowing the hydrocarbon gases to migrate into said inverted conduit;
- at least one gas detector assembly carried by said gas collector assembly, said gas detector assembly including a gas detecting member for detecting the hydrocarbon gas collected within said gas collector assembly;
- processing means in electronic communication with said gas detecting member for monitoring a rate of migration of the hydrocarbon gas detected by said gas detecting member, comparing the rate of migration to a known normal background rate of migration, and for indicating when the rate of migration accelerates beyond the normal background rate of migration; and
- means for providing electronic communication between said gas detecting member and said processing circuitry.

9. The earthquake early warning system of claim 8 wherein said conduit defines a subterranean, inverted conduit member filled with an inert aggregate and including a flange member for preventing surface originated groundwater from seeping directly beneath said inverted conduit and further including a gas permeable soil interface member for retaining said aggregate within said inverted conduit while allowing the hydrocarbon gases to migrate into said inverted conduit.

10. The earthquake early warning system of claim 8 wherein said detector assembly further includes a detector tube associated with said gas detecting member an access tube for allowing access to said gas detecting member for servicing said gas detecting member.

11. The earthquake early warning system of claim 10 wherein said access tube is secured to said inverted conduit and concentrically registers with an opening in said inverted conduit, said access tube further including a gasket disposed between said access tube and said inverted conduit and an O-ring disposed between said detector tube and said access tube, said gasket and said O-ring for preventing surface originated groundwater from entering said inverted conduit.

12. The earthquake early warning system of claim 10 wherein said inverted conduit is tapered.

13. The earthquake early warning system of claim 10 wherein said inverted conduit further includes a first end cap and a second end cap disposed on each end of said inverted conduit, said end caps sealing said ends of said inverted conduit.

14. The earthquake early warning system of claim 13 wherein said first end cap is adapted with a grommet for receiving an elongated tube for blowing said aggregate into interior volume of said inverted conduit and further wherein said second end cap is adapted with a grommet for receiving a line, said line being secured to said elongated tube thereby allowing said elongated tube to be pulled through the interior volume of said inverted conduit.

15. An earthquake early warning system for detecting seismic activity that precedes an earthquake, said earthquake early warning system comprising:
- a gas collector assembly including a conduit for collecting hydrocarbon gas migrating through subterranean strata, said conduit defining an inverted funnel member for collecting gases migrating through water, said inverted funnel member having an upper portion and a lower portion, and a toroidal float member stabilized in the water by means of a fastening means, said toroidal float member being concentrically joined to said lower portion of said inverted funnel member with a continuous, air-tight junction;
- at least one gas detector assembly carried by said gas collector assembly, said gas detector assembly including a gas detecting member for detecting the hydrocarbon gas collected within said gas collector assembly and an air-tight detector housing carried by said upper portion of said inverted funnel member for housing said gas detecting member, a vent having a one-way valve for venting the gases after detection and for preventing atmospherically originated gaseous influences;
- processing means in electronic communication with said gas detecting member for monitoring a rate of migration of the hydrocarbon gas detected by said gas detecting member, comparing the rate of migration to a known normal background rate of migration, and for indicating when the rate of migration accelerates beyond the normal background rate of migration; and
- means for providing electronic communication between said gas detecting member and said processing means.

16. The earthquake early warning system of claim 15 wherein said toroidal float member is secured to an anchor member by said fastening means.

* * * * *